United States Patent [19]
Hensley et al.

[11] 3,926,871
[45] Dec. 16, 1975

[54] POLYMERIZATES OF OLEFINIC NITRILES

[75] Inventors: Linda W. Hensley, Bainbridge Township, Geauga County; George S. Li, Aurora, both of Ohio

[73] Assignee: The Standard Oil Company, Cleveland, Ohio

[22] Filed: Nov. 20, 1974

[21] Appl. No.: 525,377

[52] U.S. Cl....... 260/80.72; 260/85.5 B; 260/80.81; 260/81
[51] Int. Cl.²........................................ C08F 244/00
[58] Field of Search.......... 260/81.0, 80.72, 85.5 B, 260/80.77, 80.81

[56] References Cited
OTHER PUBLICATIONS
"Preparative Methods of Polymer Chemistry," W. R. Sorenson and T. W. Campbell, Interscience Publ., Ine., N.Y. 1961.

"The Chemistry of Acrylonitrile" 2nd Ed., American Cyanamid Co., Petrochem. Dept., N.Y. 1959.

*Primary Examiner*—Joseph L. Schofer
*Assistant Examiner*—F. R. Cervi
*Attorney, Agent, or Firm*—John F. Jones; Sherman J. Kemmer

[57] ABSTRACT

Polymer resins which are high softening and function as gas and vapor barrier materials are composed of an olefinically unsaturated nitrile, such as acrylonitrile, an ester of an olefinically unsaturated carboxylic acid, such as methyl acrylate, and indene.

4 Claims, No Drawings

POLYMERIZATES OF OLEFINIC NITRILES

The present invention relates to novel polymeric compositions which have low permeability to gases, and high-softening temperatures, and more particularly pertains to high-softening compositions which function as gas and vapor barrier materials and are composed of the essential components of an olefinically unsaturated nitrile, an ester of an olefinically unsaturated carboxylic acid, and indene, and to a process for preparing them.

The novel polymeric products of the present invention are prepared by polymerizing a major portion of an olefinically unsaturated nitrile, such as acrylonitrile, and a minor portion of an ester of an olefinically unsaturated carboxylic acid, such as methyl acrylate, and indene.

The olefinically unsaturated nitriles useful in this invention are the alpha, beta-olefinically unsaturated mononitriles having the structure

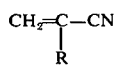

wherein R is hydrogen, a lower alkyl group having from 1 to 4 carbon atoms, or a halogen. Such compounds include acrylonitrile, alpha-chloroacrylonitrile, alpha-fluoro-acrylonitrile, methacrylonitrile, ethacrylonitrile, and the like. The preferred olefinically unsaturated nitrile in the present invention is acrylonitrile.

The esters of olefinically unsaturated carboxylic acids useful in this invention are preferably the lower alkyl esters of alpha, beta-olefinically unsaturated carboxylic acids, and more preferred are the esters having the stucture

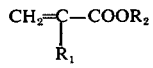

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. Most preferred are methyl and ethyl acrylates and methacrylates.

Indene (1-H-indene) and coumarone (2,3-benzofuran) and mixtures are useful as monomers in the present invention. Most preferred is indene.

The polymeric compositions of the present invention can be prepared by any of the known general techniques of polymerization, including the bulk polymerization, solution polymerization, and emulsion or suspension polymerization techniques by batch, continuous or intermittent addition of the monomers and other components. The preferred method is emulsion polymerization. The polymerization is preferably carried out in an aqueous medium in the presence of an emulsifier and a free-radical generating polymerization initiator at a temperature of from about 0° to 100°C in the substantial absence of molecular oxygen.

The preferred polymeric compositions embodied herein are those resulting from the polymerization of (A) about 60 to 90% by weight of at least one nitrile having the structure

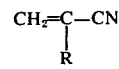

wherein R has the foregoing designation, (B) from 10 to 39% by weight of an ester having the structure

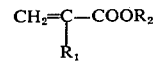

wherein $R_1$ and $R_2$ have the foregoing designations, and (C) from 1 to 15% by weight of at least one member selected from the group consisting of indene and coumarone wherein the given percentages of (A), (B), and (C) are based on the combined weight of (A), (B), and (C).

More specifically, the present invention can be illustrated in the polymerization of a mixture of acrylonitrile, methyl acrylate, and indene to produce a product having exceptionally good impermeability to gases and vapors, and improved ASTM heat-distortion temperature. Preferably, the acrylonitrile-methyl acrylate-indene monomer component should contain 70 to 90% by weight of acrylonitrile, 10 to 29% by weight of methyl acrylate, and 1 to 15% by weight of indene.

The novel polymeric products of the present invention are thermoplastic materials which can be thermoformed into a wide variety of useful articles in any of the conventional ways employed with known thermoplastic polymeric materials, such as by extrusion, milling, molding, drawing, blowing, etc. The polymeric products of this invention have excellent solvent resistance, and their low permeability to gases and vapors make them useful in the packaging industry, and they are particularly useful in the manufacture of bottles, film, and other types of containers for liquids and solids.

In the following illustrative examples, the amounts of ingredients are expressed in parts by weight unless otherwise indicated.

EXAMPLE 1

A. An emulsion polymerization was run using the following ingredients and procedure:

| Ingredient | Parts |
| --- | --- |
| acrylonitrile | 75 |
| methyl acrylate | 20 |
| indene | 5 |
| GAFAC RE-610* \} pH → 6 | 1.5 |
| water | 230 |
| n-dodecyl mercaptan | 0.1 |
| potassium persulfate | 0.06 |

*A mixture of R—O(CH$_2$CH$_2$O—)$_n$PO$_3$M$_2$ and [R—O(CH$_2$CH$_2$O—)$_n$]$_2$PO$_2$M wherein n is a number of from 1 to 40, R is an alkyl or alkaryl group and preferably a nonyl phenyl group, and M is hydrogen, ammonia or an alkali metal, which composition is sold by the General Aniline and Film Corporation.

The polymerization was carried out in an 8-ounce glass bottle. Both container and ingredients were purged with nitrogen. The bottle was rotated end over end for 16 hours at 60°C. The resulting latex was filtered through cheesecloth to remove prefloc, then the polymer was recovered by coagulation in a hot aluminum-sulfate solution, water washed, and dried in a vacuum oven. Bars and films were compression molded from the powder for physical testing. Properties are summarized in Table 1.

B. The recipe and procedure of Example 1A were followed except that the monomer ratio was 75/25 acrylonitrile/methyl acrylate. Properties of this polymer which is outside the scope of the present invention are also summarized in Table 1. In Table 1 and succeeding tables, "AN" designates "acrylonitrile," "MA" designates "methyl acrylate," "IN" designates "indene," "HDT" designates "ASTM heat-distortion temperature," "WVTR" designates "water vapor transmission," and "OTR" designates "oxygen transmission."

The procedure followed was that described in Example 1A except that the polymerization was run for 8 hours. Properties are summarized in Table 3. In every case the copolymers described above which contained indene in them had lower water vapor transmission and oxygen transmission than the copolymer which had no indene in it.

Table 3

| Monomer Ratio | | | HDT (264 psi) °C | Flexural Strength psi | Flexural Modulus psi × $10^{-5}$ | Rockwell Hardness M Scale |
| --- | --- | --- | --- | --- | --- | --- |
| AN | MA | IN | | | | |
| 80 | 20 | — | 69 | 4640 | 6.53 | 87 |
| 80 | 18 | 2 | 72 | 3430 | 5.73 | 90 |
| 80 | 15 | 5 | 75 | 3500 | 6.27 | 92 |
| 80 | 13 | 7 | 81 | 3260 | 6.18 | 96 |
| 80 | 10 | 10 | 84 | 4690 | 5.42 | — |

Table 1

| Monomer Ratio | | | % AN in Polymer | HDT (264 psi) °C | Flexural Strength psi | Flexural Modulus psi × $10^{-5}$ | Rockwell Hardness M Scale | WVTR (g-mil) 100 in²/24 hrs/atm | OTR (cc-mil) 100 in²/24 hrs/atm |
| --- | --- | --- | --- | --- | --- | --- | --- | --- | --- |
| AN | MA | IN | | | | | | | |
| 75 | 20 | 5 | 72 | 78 | 23,100 | 5.83 | 97 | 4.1 | 0.35 |
| 75 | 25 | — | 74 | 68 | 22,100 | 5.98 | 90 | 4.5 | 3.4 |

EXAMPLE 2

A series of polymers containing increasing amounts of indene was prepared according to the following recipe:

| Ingredient | Parts |
| --- | --- |
| acrylonitrile | 75 |
| methyl acrylate | 25–15 |
| indene | 0–10 |
| GAFAC RE-610 } pH → 6  water | 3  230 |
| limonene dimercaptan | 1.3 |
| potassium persulfate | 0.2 |

The procedure followed was that described in Example 1A except that the polymerization was run for 8 hours. Properties are summarized in Table 2. As in Example 1, the polymers described above containing indene in them were lower in water vapor transmission and oxygen transmission than the polymer made from acrylonitrile and methyl acrylate only.

Table 2

| Monomer Ratio | | | HDT (264 psi) °C | Rockwell Hardness M Scale |
| --- | --- | --- | --- | --- |
| AN | MA | IN | | |
| 75 | 25 | — | 66 | 78 |
| 75 | 23 | 2 | 70 | 82 |
| 75 | 20 | 5 | 73 | 88 |
| 75 | 18 | 7 | 77 | 86 |
| 75 | 15 | 10 | 77 | 91 |

EXAMPLE 3

A series of polymers containing increasing amounts of indene was prepared according to the following recipe:

| Ingredient | Parts |
| --- | --- |
| acrylonitrile | 80 |
| methyl acrylate | 20–10 |
| indene | 0–10 |
| GAFAC RE-610 } pH → 6  water | 3  230 |
| limonene dimercaptan | 1.3 |
| potassium persulfate | 0.2 |

EXAMPLE 4

A series of polymers was prepared according to the following recipe:

| Ingredient | Parts |
| --- | --- |
| acrylonitrile | 75 |
| methyl acrylate | 25–10 |
| indene | 0–15 |
| GAFAC RE-610 } pH → 6.5  water | 3  230 |
| limonene dimercaptan | 0.5 |
| potassium persulfate | 0.2 |

The procedure followed was that described in Example 1A. Properties are summarized in Table 4. As in Examples 1–3, the polymers described above prepared with indene had much lower water vapor transmission and oxygen transmission than the copolymer prepared just from acrylonitrile and methyl acrylate.

Table 4

| Monomer Ratio | | |
| --- | --- | --- |
| AN | MA | IN |
| 75 | 25 | — |
| 75 | 20 | 5 |
| 75 | 15 | 10 |
| 75 | 10 | 15 |
| 70 | 15 | 15 |
| 65 | 20 | 15 |
| 60 | 25 | 15 |

EXAMPLE 5

An emulsion polymerization was run in a 1-liter, four-necked glass resin kettle using the following ingredients and procedure:

| Ingredient | Parts |
| --- | --- |
| acrylonitrile | 75 |
| methyl acrylate | 18 |
| indene | 7 |
| GAFAC RE-610 } pH → 6.5  water | 3  230 |
| limonene dimercaptan  (added incrementally over  3 hours, to 29% conversion) | 0.7 |
| potassium persulfate | 0.15 |

The resin kettle was equipped with a stirrer, thermometer, addition funnel, and nitrogen lines. The jacketed flask was heated by circulating water. The reaction was carried out for 6 hours at 60° to 63°C, and the resulting latex was filtered through cheesecloth. Polymer was recovered by coagulation in a hot aluminum-sulfate solution, washed with water, and dried in a vacuum oven. Bars and films were compression molded from the powder for physical testing. Properties are summarized in Table 5. This resin had very low water vapor transmission and oxygen transmission and was easily processable in usual processing equipment used for thermoplastic materials.

Table 5

| Monomer Ratio | | | HDT (264 psi) °C | Flexural Strength psi | Flexural Modulus psi × 10⁻⁵ | Rockwell Hardness M Scale |
|---|---|---|---|---|---|---|
| AN | MA | IN | | | | |
| 75 | 18 | 7 | 81 | 13,100 | 6.23 | 98 |

We claim:

1. The terpolymer composition resulting from the copolymerization of
   A. from about 60 to 90% by weight of at least one nitrile having the structure

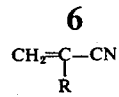

wherein R is hydrogen, a lower alkyl group having from 1 to 4 carbon atoms, or a halogen,
   B. from about 10 to 39% by weight of an ester having the structure

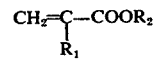

wherein $R_1$ is hydrogen, an alkyl group having from 1 to 4 carbon atoms, or a halogen, and $R_2$ is an alkyl group having from 1 to 6 carbon atoms, and
   C. from about 1 to 15% by weight of at least one member selected from the group consisting of indene and coumarone
wherein the given percentages of (A), (B), and (C) are based on the combined weight of (A), (B), and (C).

2. The composition of claim 1 wherein (A) is acrylonitrile.

3. The composition of claim 2 wherein (B) is methyl acrylate.

4. The composition of claim 3 wherein (C) is indene.

* * * * *